US008384757B2

(12) United States Patent
Triplett et al.

(10) Patent No.: US 8,384,757 B2
(45) Date of Patent: Feb. 26, 2013

(54) SYSTEM AND METHOD FOR PROVIDING VIDEOCONFERENCING AMONG A PLURALITY OF LOCATIONS

(75) Inventors: Clifton N. B. Triplett, Spring, TX (US); Bryce M. Findley, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 263 days.

(21) Appl. No.: 13/004,542

(22) Filed: Jan. 11, 2011

(65) Prior Publication Data

US 2012/0176465 A1    Jul. 12, 2012

(51) Int. Cl.
*H04N 7/14* (2006.01)
(52) U.S. Cl. ............... 348/14.07; 348/14.08; 348/14.09
(58) Field of Classification Search .... 348/14.01–14.16; 370/260–261; 715/753, 755; 709/204–205
See application file for complete search history.

(56) References Cited

U.S. PATENT DOCUMENTS

| | | | |
|---|---|---|---|
| 5,953,050 A | 9/1999 | Kamata et al. | |
| 6,160,573 A | 12/2000 | Allen et al. | |
| 6,195,116 B1 | 2/2001 | Lee | |
| 2003/0117487 A1 | 6/2003 | Monroe | |
| 2005/0024484 A1* | 2/2005 | Leonard et al. | 348/14.01 |
| 2005/0262201 A1 | 11/2005 | Rudolph et al. | |
| 2008/0266380 A1* | 10/2008 | Gorzynski et al. | 348/14.08 |
| 2010/0157017 A1 | 6/2010 | Pepperell | |
| 2010/0245537 A1 | 9/2010 | Yu et al. | |
| 2010/0328422 A1 | 12/2010 | Harel et al. | |
| 2011/0181685 A1* | 7/2011 | Saleh et al. | 348/14.08 |

* cited by examiner

*Primary Examiner* — Melur Ramakrishnaiah
(74) *Attorney, Agent, or Firm* — Cantor Colburn LLP

(57) ABSTRACT

A method of displaying images among a plurality of spaced apart locations is provided, which method, in one exemplary embodiment, includes displaying an image associated with a first location on a first surface at a central location, displaying an image associated with a second location on a second surface at the central location, and displaying an image associated with the central location and the image associated with the first location at a common surface at the second location.

16 Claims, 6 Drawing Sheets

SYSTEM AND METHOD FOR PROVIDING VIDEOCONFERENCING AMONG A PLURALITY OF LOCATIONS

BACKGROUND

1. Field of the Disclosure

This disclosure relates generally to systems and methods for providing videoconferencing among various locations.

2. Brief Description of The Related Art

Videoconferencing is commonly used among two or more locations for conducting a variety of business activities. When three or more locations are connected for videoconferencing, at each location separate images from each of the other locations are projected on a surface. Thus, persons at each location have to view two or more screens to conduct the conference. The disclosure herein provides a system and method for videoconferencing wherein common or merged images of two locations may be projected or rendered at selected locations.

SUMMARY

In one aspect of the disclosure, a method of displaying video images among a plurality of spaced apart locations is provided. In one embodiment, such method, includes displaying an image associated with a first location on a first surface at a central location, displaying an image associated with a second location on a second surface at the central location, and displaying an image associated with the central location and the image associated with the first location at a common surface at the second location.

In another aspect, a system for providing videoconferencing among at least three locations is provided. In one embodiment, such a system may include a first device configured to transmit an image associated with the first location, a second device configured to transmit an image associated with the second location, a third device at a central location configured to display the image associated with the first location and the image associated with the second location at the central location, and transmit a first common image of the central location and the image associated with the first location to the second location and a second common image of the central location and the image associated with the second location to the first location.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION

Figure 1:
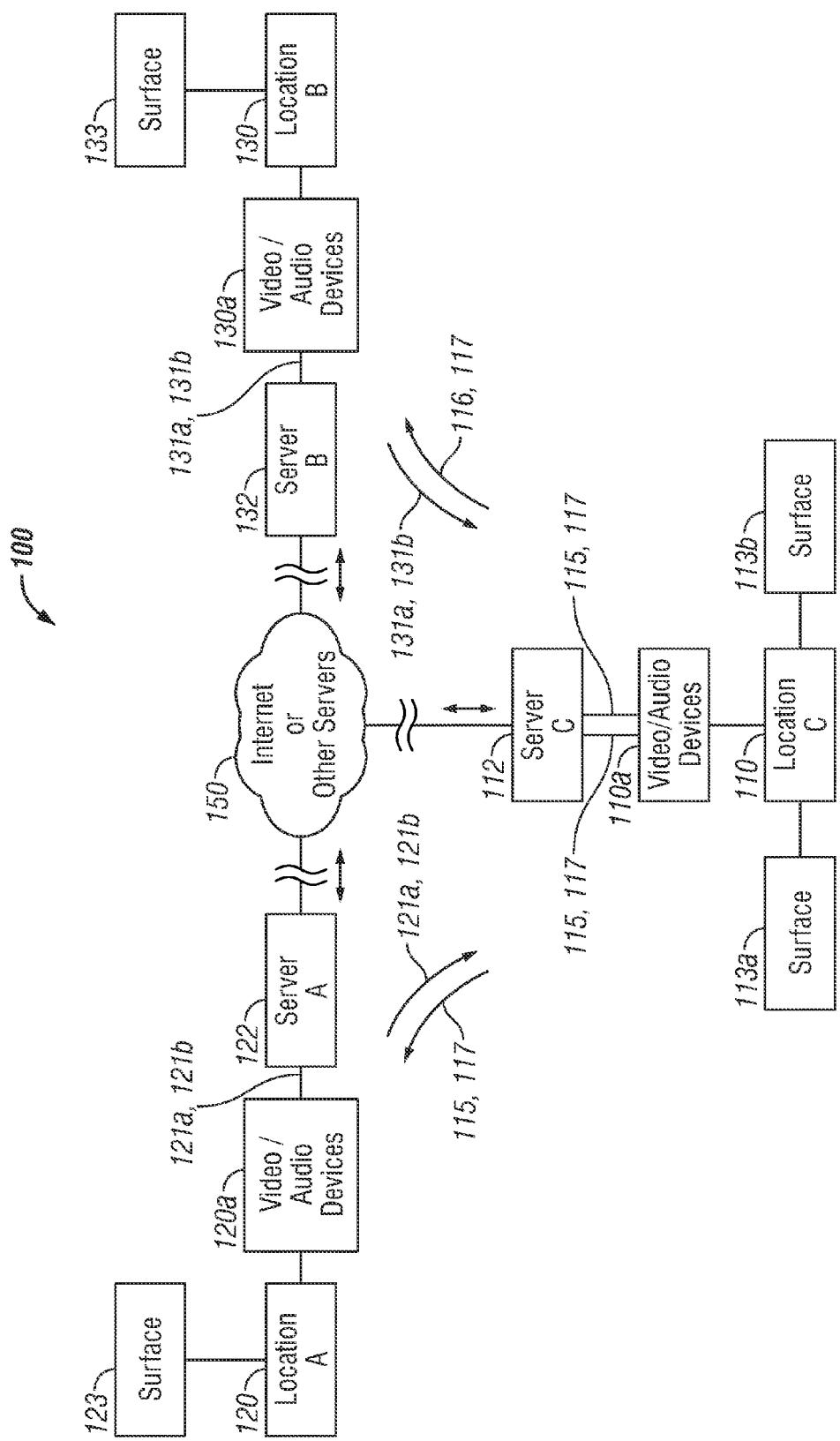
FIG. 1 is a line diagram of an exemplary system that may be utilized to provide videoconferencing among three or more locations, according to one embodiment of the disclosure.

FIG. 1 is a line diagram of an exemplary system 100 that may be utilized to provide videoconferencing among three or more locations, according one embodiment of the disclosure. The system 100 is shown to include three spaced apart locations, including a central location 110 (location C), a first satellite location 120 (location A) and a second satellite location 130 (location B). Three locations are used herein to describe the concepts for ease of explanation. However, any number of locations may be utilized for the purposes of providing videoconferencing according to this disclosure. In one aspect, the first satellite location 120 includes one or more devices 120a that transmit video images 121a and audio signals 121b associated with the first satellite location 120 via a local server-A 122 to the Internet 150. Alternatively, the devices 120a may transmit the images 121a and audio signals 121b to the Internet 150 or the central location 110 by any other suitable method, such as cellular towers, direct connection, etc. Similarly, devices 130a transmit video images 131a and audio signals 131b associated with the second satellite location 130 via server-B 132 to the Internet 150 or the central location 110. The devices 120a and 130a may include any suitable devices, including, but not limited to, video cameras and other image capture or display devices.

Still referring to FIG. 1, the central location 110 includes devices 110a that, in one aspect, receive the images 121a and audio signals 121b via server-C 112 and display the images 121a on a first surface 113a at the central location 110 and provide audio associated with signals 121b at location 110. Similarly, the devices 110a receive the images 131a and audio signals 131b of the second satellite location 130 and display the images 131a on a second surface 113b at the central location 110 and provide audio associated with signals 131b at location 110. In addition, the devices 110a associated with the central location 110: (i) transmit common images 115 of the central location 110 and the first satellite location 120 and the audio signals 117 relating to the central location 110 via any suitable route or method, including a server 112 sending information to the Internet 150 or to the second satellite location 130 by any other suitable method;

and (ii) transmit common images 116 of the central location 110 and the second satellite location 130 and the audio signals 117 relating to the central location 110 via server 112 to the Internet 150 or to the first satellite location 120 by any other suitable method. In this manner, the video images and audio relating to the central location 110 and the first satellite location 120 are provided to the second satellite location 130 and the video images and audio relating to the central location and the first satellite location are provided to the first satellite location. The manner of displaying the images at each of the locations is described in more detail in reference to FIGS. 2-5.

Figure 2:
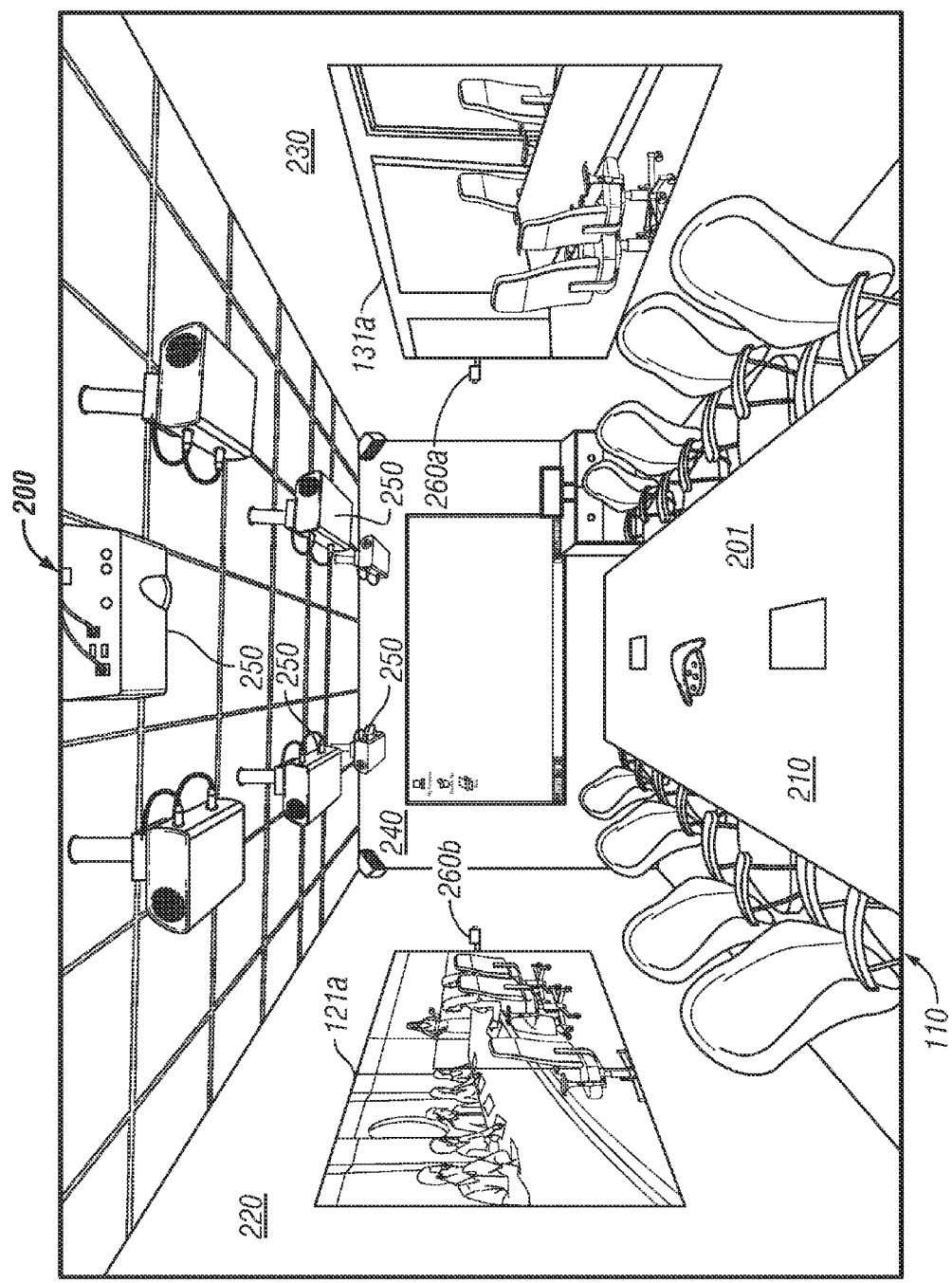
FIG. 2 shows a perspective view of an exemplary central location showing a live image of a first remote or satellite location on a first surface and a live image of a second remote or satellite location on a second surface and an exemplary configuration of audio and video devices at the central location configured to provide images of the central location and the first remote location to the second remote location and of the central location and the second satellite location to the first location, according to one embodiment of the disclosure.

FIG. 2 shows a perspective view 200 of the exemplary central location 110 showing videoconferencing among the locations 110, 120 and 130, according to one embodiment of the disclosure. For ease of explanation, the location 110 is shown as a conference room 201 that includes table 210 and a first vertical surface 220 (wall or a projection surface), a second vertical surface 230 (wall or a projection surface) and a third vertical surface 240 (wall or a projection surface) between or joining the surfaces 220 and 230. The surfaces 220 and 230 are shown opposite each other. In one aspect, devices 250 in the central location 110 may be configured to display the images 121a associated with the first satellite location 120 at the first surface 220 and the images 131a associated with the second satellite location 130 on the second surface 230. The audio associate with the audio signals 121b from the first location 120 and the audio associated with the audio signals 131b from the second location 130 are provided at the central location 110 by one or more devices 250 at the central location 110. Additional images relating to one or more other aspects, such presentations or images from another satellite location may be displayed at the surface 240. In other aspects, images from additional satellite locations (not shown) may be displayed on a side of one or more of the surfaces 220, 230 and 240 at the central location. The display of images relating to the central location 110 and one satellite location at theanother satellite location is explained in more detail in reference to FIGS. 3-5.

Figure 3:
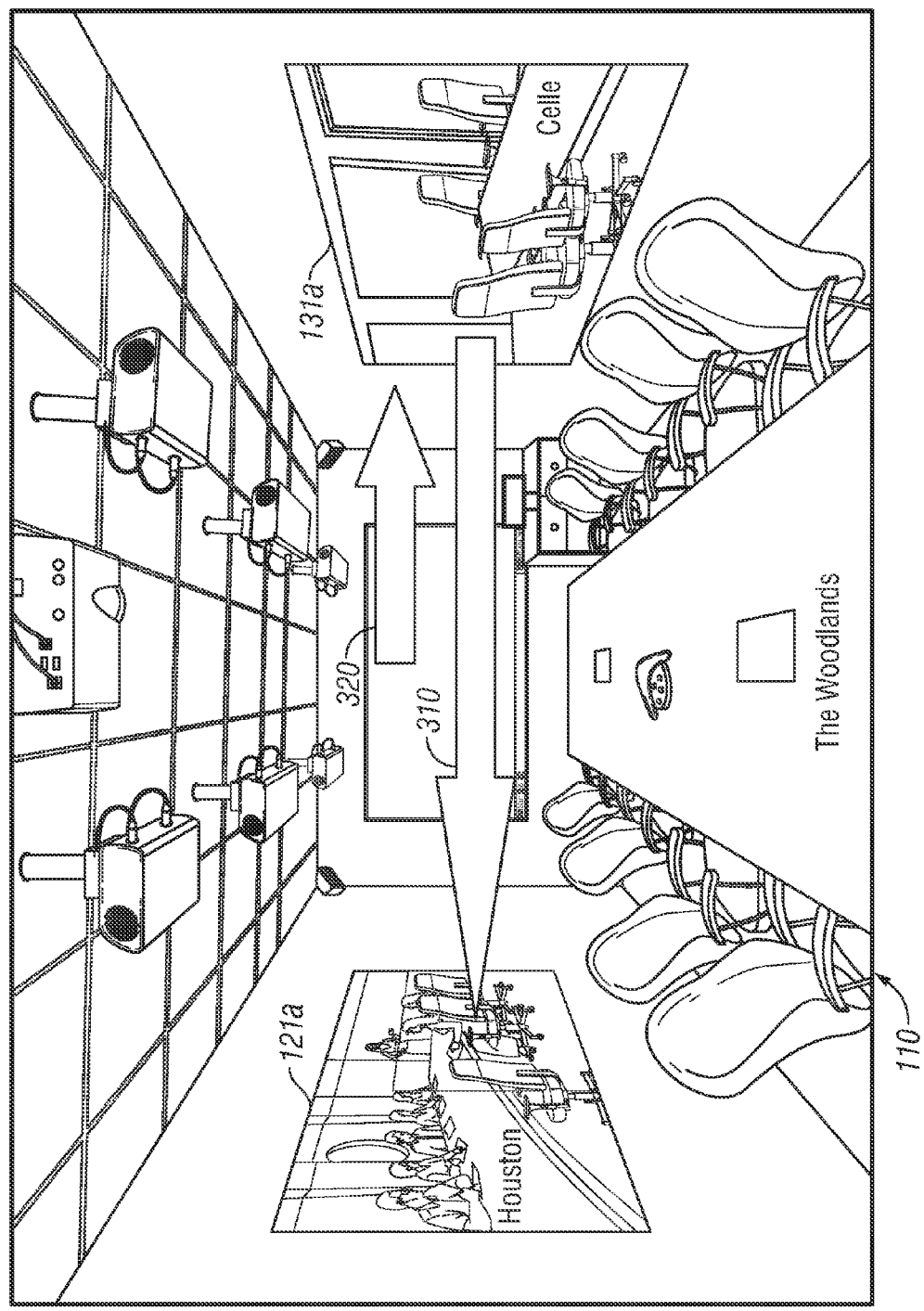
FIG. 3 is a perspective view of the exemplary central location showing obtaining a common image of the central location and the first satellite location for projection at the second remote location, according to one embodiment of the disclosure.

FIG. 3 is a perspective view of the exemplary central location 110 (FIG. 2) showing a manner of obtaining and transmitting a common image of the central location 110 and the image 121a of the first satellite location 120 to the second satellite location 120. Referring to FIGS. 1-3, a device 260a, such as a video camera, may be utilized to (i) take a common image 310 (shown by arrow in FIG. 3) of the central location 110 and the image 121a of the first location 120 on the surface 220; and (ii) transmit such common image to the second location 130 in a manner described in reference to FIG. 1. Similarly, a device 260b, such as a video camera, may be utilized to (i) take a common image 320 of the central location 110 and the image 131a of the second location 130 on the surface 230; and (ii) transmit such common image to the first satellite location 120 in a manner described in reference to FIG. 1.

Figure 4:
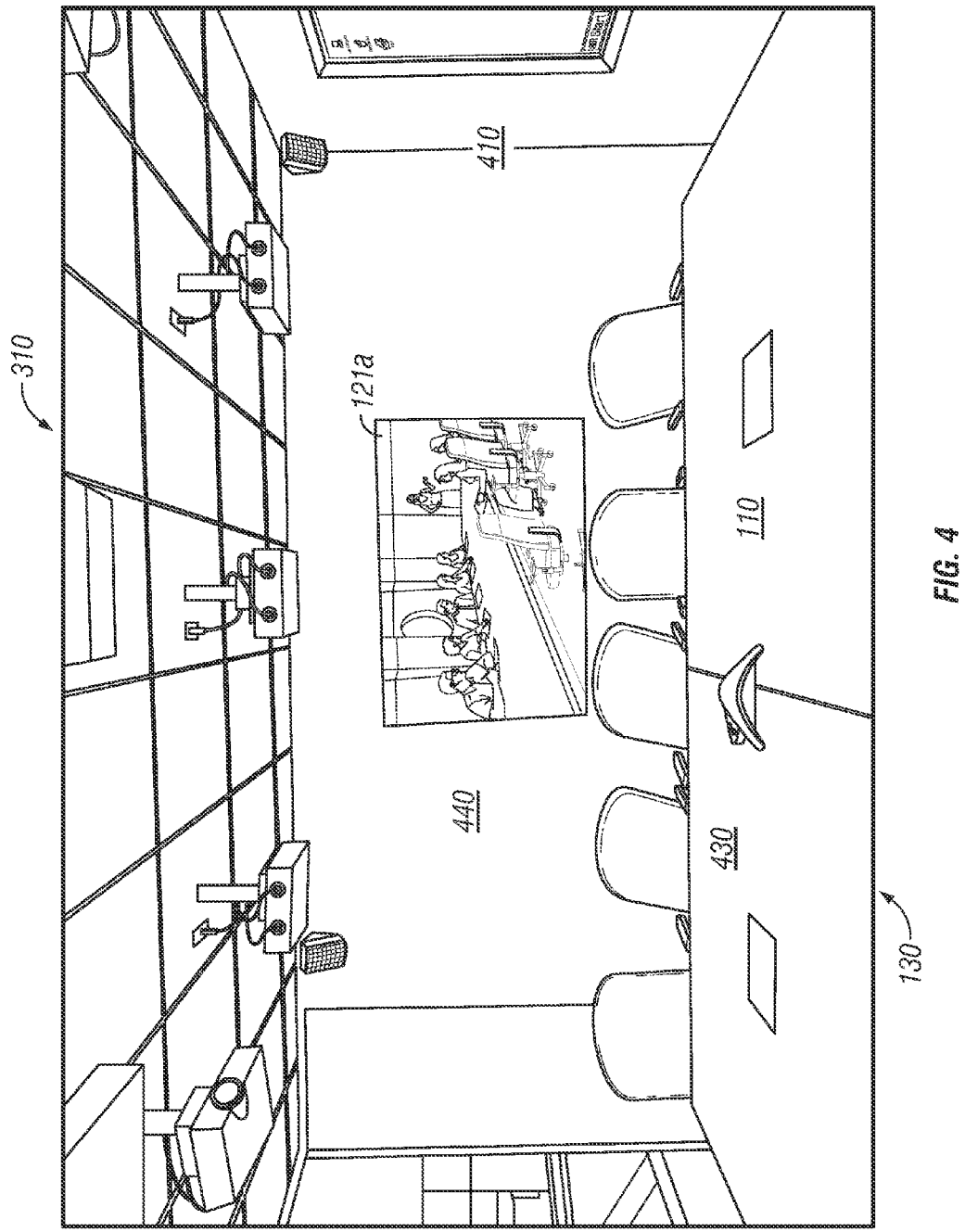
FIG. 4 is a perspective view of the second remote location displaying the image of the central location and the first location on a surface at the second remote location as such image would be viewed at the central location as if there is a glass wall between the central location and the first satellite location.

As shown in FIG. 4, the common image 310 of the central location 110 and the first satellite location 120 may then be displayed on a surface 410 of the second satellite location 130 by one or more devices at the location 130. The devices at location 130 also are used to transmit the images 131a and audio signals 116 from the second satellite location 130 as described earlier in reference to FIG. 1. As shown in FIG. 4, the image 310 will be displayed on the surface 410 at the second location 130 as a common image, wherein one portion (the front portion) 430 of the common image 310 corresponds to the image of the central location 110, while the second (the back portion) portion 440 of the common image 310 corresponds to the image 121a of the first satellite location displayed at the central location 110. Thus, in one aspect, the image 310 displayed at the second satellite location 130 will appear as an image taken of the central location 110 located in the front and the first satellite location 120 in the back with a glass wall or no wall between the central location 110 and the first location 120. Accordingly, the common image 310 provided at the second satellite location 130 provides an image of two other locations consolidated into one image, thereby simplifying the video conference while improving the experience for the users. Further, by sending a single video image to selected locations, the system enables the videoconferencing to occur over a reduced bandwidth.

Figure 5:
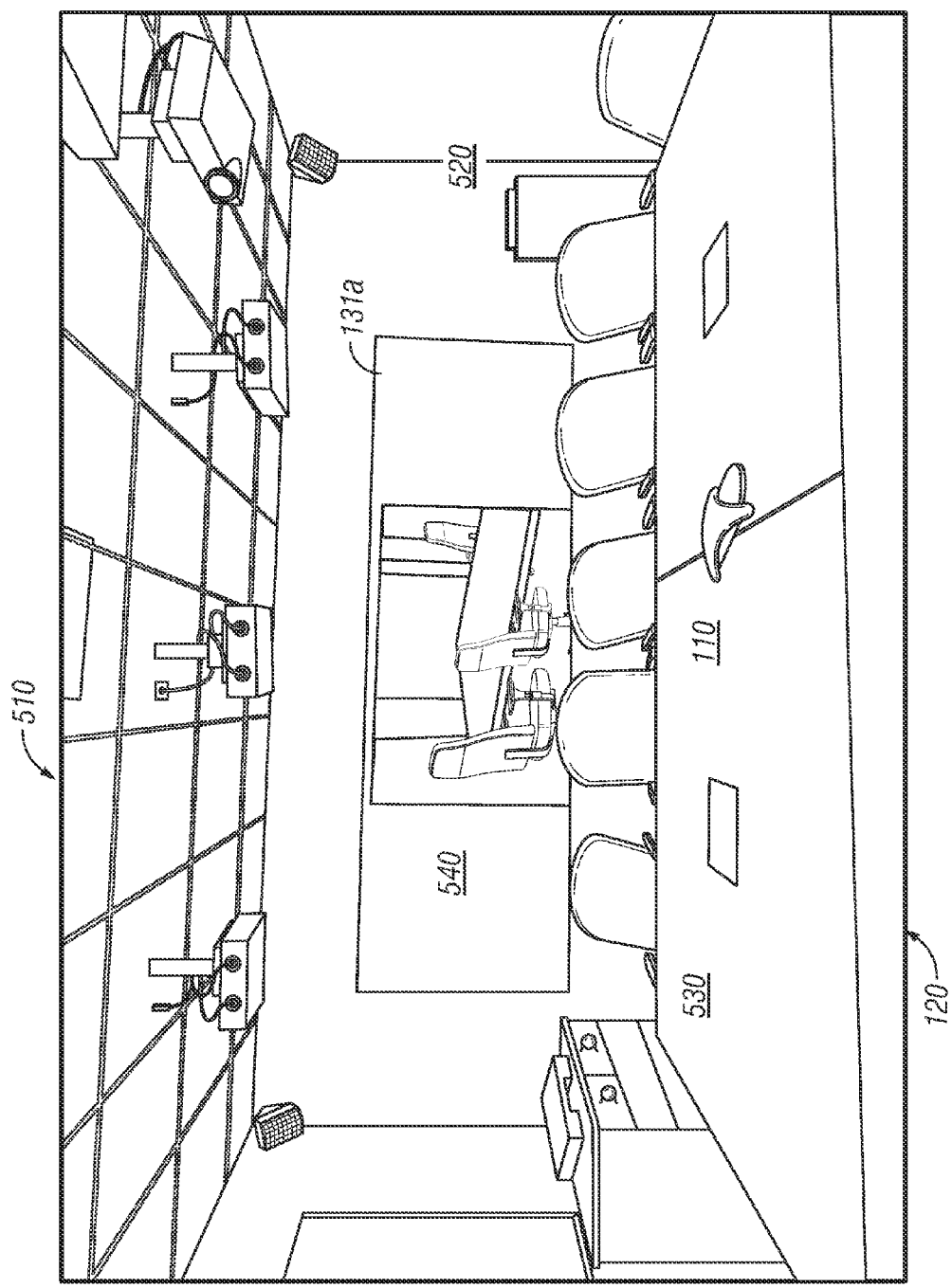
FIG. 5 is a perspective view of the first remote location displaying the image of the central location and the first location on a surface at the second remote location as such image would be viewed at the central location as if there is a glass wall between the central location and the first satellite location.

FIG. 5 shows a common image 510 of the central location 110 and the second satellite location 130 displayed on a surface 520 of the first and satellite location 120 by one or more devices (not shown) at the first location 120. The devices at the at the first satellite location 120 are also used to transmit the images 121a and audio signals 121b from the second satellite location 120 as described earlier in reference to FIG. 1. As shown in FIG. 5, the image 510 displayed on the surface 520 at the first satellite location 120 is a common image 510, wherein a first portion (the front portion) 530 of the common image 510 corresponds to the image of the central location 110, while a second portion (the back portion) 540 of the common image 510 corresponds to the image 131a of the second satellite location 130 as displayed in the central location 110. Thus, in one aspect, the image 510 displayed at the first satellite location 120 will appear similar to an image, wherein the image of the central location 110 is in the front and the image of the second satellite location 130 is in the back, with a glass wall between the two locations.

In this manner, one of the locations may be utilized as a central location, while the other locations as the satellite locations, wherein images of the satellite locations are displayed at the central location while the common images of the central location and the satellite locations are displayed at selected or desired satellite locations. For more than three locations, common images of the central location and a first satellite location may be displayed at a first surface at the second satellite location along with, for example, images from a third satellite location on a second surface of the second location or on a side of the common image. The phrases "common image" and "consolidated image" are used as synonyms.

Figure 6:
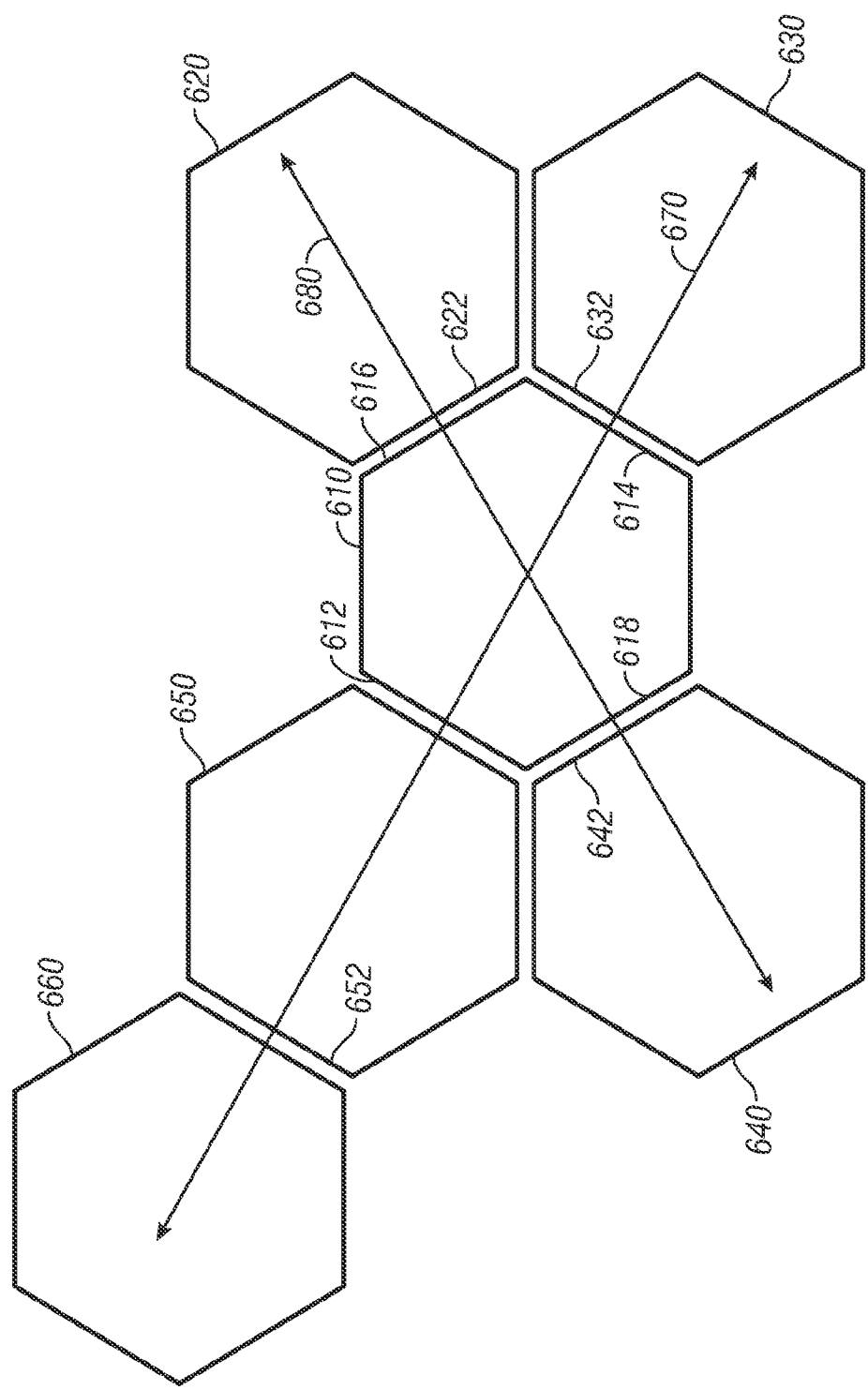
FIG. 6 is plan view of a central location having multiple display walls and a number of remote locations and a manner of displaying images of the central location and the remote locations among such locations.

The above described system and methods may be readily extended to create a natural environment or feeling of an extended location, such as a conference room, because the system and concepts described herein provide the ability to add new rooms on far walls of glass walls. Thus, if for example a location is in a pentagon or hexagon shape, the glass wall concept may be extended to view one direct room and one or more viewable locations through the glass wall viewing. Thus, from a central location with a shared front wall, the central room could see the front wall and at least 4 other rooms and 1 or 2 more rooms through the direct attached locations. This location concept may further be utilized to create virtual rooms from elements as small as one person linking to another and another. FIG. 6 is plan view of an exemplary central location 610 and multiple remote locations 620, 630, 640, 650 and 660. As an example, each location is shown to be a hexagon. In this exemplary configuration, the central location 610 may be configured to display locations shown along the line 670. For example, locations 650 and 660 may be displayed on wall 612, location 630 on wall 614, location 620 on wall 616 and location 640 on wall 618. In this particular configuration, location 660 will be displayed on the wall 612 behind the location 650, and will give the impression of a picture inside a picture. Thus, the central location 610 will have the view of each of the remote locations shown in FIG. 6. In a similar manner, location 650 may be configured to display location 660 on wall 652 and locations 610 or 610 and 630 on wall 654, wherein location 630 will be displayed within the display of location 610. The location 620 may be configured to display locations along the line 680. For example, location 610 or location 610 and 640 may be displayed on wall 622. Location 630 may be configured to display locations along line 670. For example, location 610 or 610 and 650 or 610, 650 and 660 may be displayed on wall 632. The location 640 may be configured to display location 610 or 610 and 620 on wall 642.

For ease of explanation, the methods and systems herein are described as utilizing audio and video devices displaying images, such systems and method, however, may utilize other suitable devices and render the images in any form, including, but not limited to projecting images on a physical surfaces, space or volume, or by way of an augmented reality approach. Therefore, the term display is utilized herein in a broad sense to include images, whether or not projected on physical surfaces. Also, the term "video image" includes any form a projected image. Additionally, the term surface is used to include a physical surface, a common location, volume or space.

Thus, in one aspect, the disclosure provides a method of displaying images among a plurality of spaced apart locations. In one embodiment, such method includes displaying an image associated with a first location on a first surface at a central location, displaying an image associated with a second location on a second surface at the central location, and displaying a common image associated with the central location and the image associated with the first location at a surface at the second location. The method, in another aspect, includes displaying a common image of the central location and the second location at a common surface at the first location. The method may further include providing audio associated with the first and the second locations at the central location, audio associated with the first location and the central location at the second location and audio associated with the second location and the central location at the first location, thereby providing videoconferencing among the first, second and the central locations.

In another aspect, a system for providing videoconferencing among at least three locations is provided. In one embodiment, the system may include a video apparatus associated with a first location configured to transmit a video image associated with the first location to a central location, a video apparatus associated with a second location configured to transmit a video image associated with the second location to the central location, a video apparatus associated with a central location configured to display the video image associated with the first location on a first surface and the video image associated with the second location at a second surface, and transmit a first common image of the central location and the image from the first surface to the second location and a second common image of the central location and the image from the second surface to the first location. In one aspect, the video apparatus associated with the second location displays the first common image at a surface at the second location and the video apparatus associated with the first location displays the second common image at a surface at the first location. In another aspect, the first surface and the second surface at the central location are on opposite sides of the central location. The system further includes a audio devices associated with the first, second and the central locations configured to provide audio associated with the first location at the central location and the second location, audio associated with the second location at the central location at the first location, and audio associated with the central location at the first and second locations, thereby providing videoconferencing among the first, second and the central locations. In another aspect, the common image of the central location and the first location displayed at the second location corresponds to a view of the central location and first location being next to each other with a glass wall between the central location and the first location.

The foregoing description is directed to certain embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

The invention claimed is:

1. A method of displaying images at a plurality of spaced apart locations, comprising:
   displaying an image associated with a first location on a first surface at a central location;
   displaying an image associated with a second location on a second surface at the central location; and
   displaying a common image associated with two of the first location, second location and the central location at a common surface at one of the first location and the second location.

2. The method of claim 1, wherein the common image creates an effect of two locations, one behind the other with a glass wall between such two locations.

3. The method of claim 1, wherein the method further comprises displaying a first common image of the first location and the central location at the second location and a second common image of the second location and the central location at the first location.

4. The method of claim 1, wherein the first surface and the second surface are on opposite sides of the central location.

5. The method of claim 1, wherein the common image comprises an image of the central location and one of the images from the first surface and the second surface.

6. The method of claim 1, further comprising providing audio associated with the first location and second location at the central location, audio associated with the first location and central location at the second location and audio associated with the second location and central location at the first location, thereby providing videoconferencing among the first location, second location and the central location.

7. The method of claim 3, wherein the first common image is obtained by a first device at the central location and a second device at the first location and the second common image is taken by the first device at the central location and a third device at the second location.

8. The method of claim 1 further comprising displaying a common image on at least one surface of the central location.

9. A system for providing videoconferencing among at least three locations, comprising:
   a first device configured to provide an image of a first location;
   a second device configured to provide an image of a second location;
   a third device configured to display the image of the first location on a first surface at a central location and the image of the second location at a second surface at the central location; and a fourth device configured to provide a common image of the central location and the image of the first location for display at the second location.

10. The system of claim 9, wherein the first surface and the second surface are at one of: (i) on different walls of the central location; and (ii) on opposite walls of the central location.

11. The system of claim 9 further comprising an audio device associated with the first location, second location and central location configured to provide: audio associated with the first location at the central location and the second location; audio associated with the second location at the central location and the first location; and audio associated with the central location at the first location and second locations, thereby providing videoconferencing among the first location, second location and the central location.

12. The system of claim 9, wherein the first common image corresponds to an image of the central location and the first location being next to each other with a glass wall between the central location and the first location.

13. The system of claim 9 further comprising a server associated with the central location configured to send the common image to the first location via a selected route.

14. The system of claim 13, wherein the selected route is one of: (i) the Internet; and (ii) a remote server.

15. The system of claim 9 further comprising a server configured to receive the common image and transmit the such image to the second location.

16. The system of claim 9, wherein the common image is a perspective view of the central location and the first location with a glass wall between the central location and the first location.

* * * * *